H. J. BURR.
STAMP AFFIXING MACHINE.
APPLICATION FILED MAY 17, 1918.
1,406,534.
Patented Feb. 14, 1922.
3 SHEETS—SHEET 1.
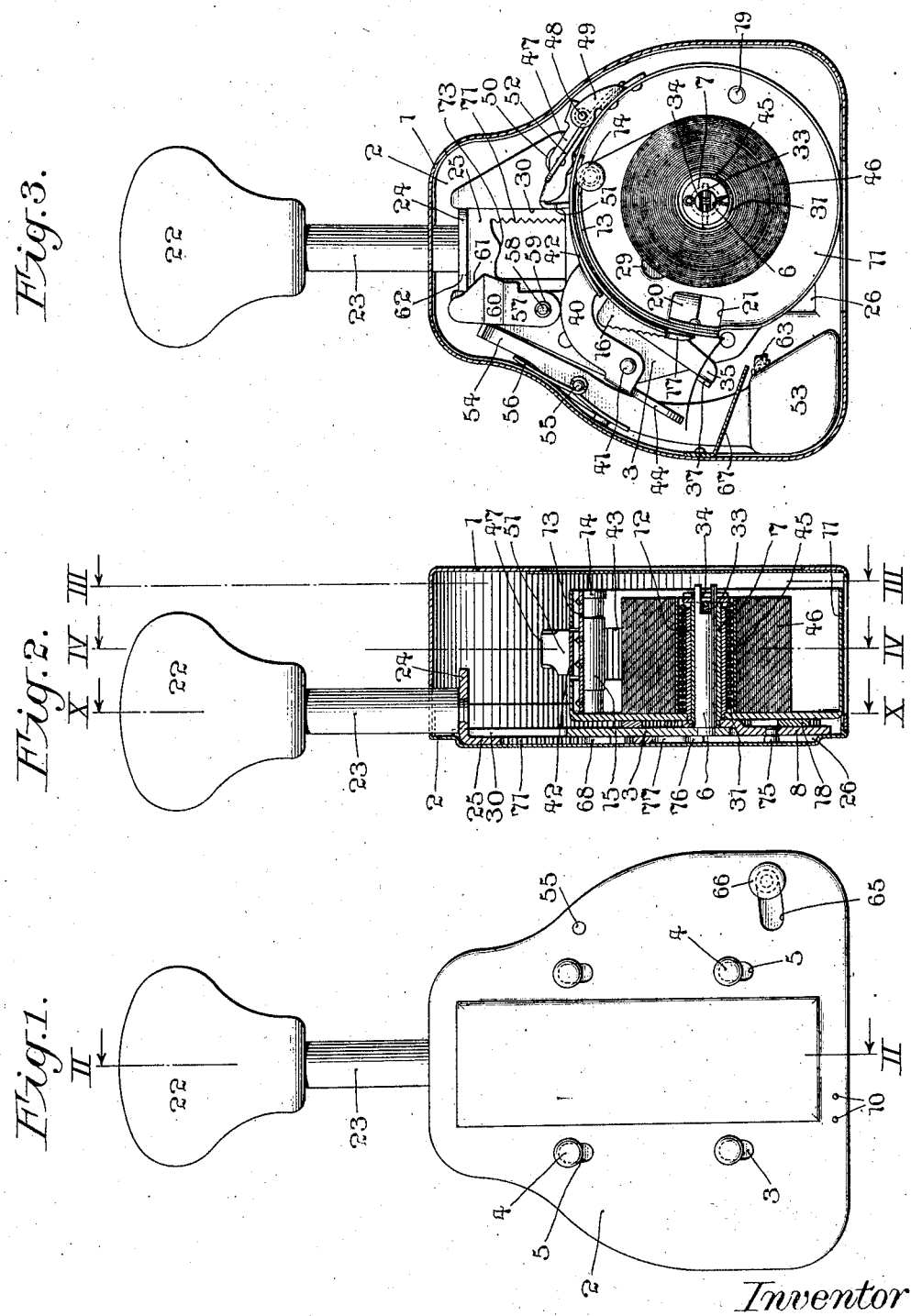
Inventor:
Harry J. Burr
by attorneys
Brown & Seward

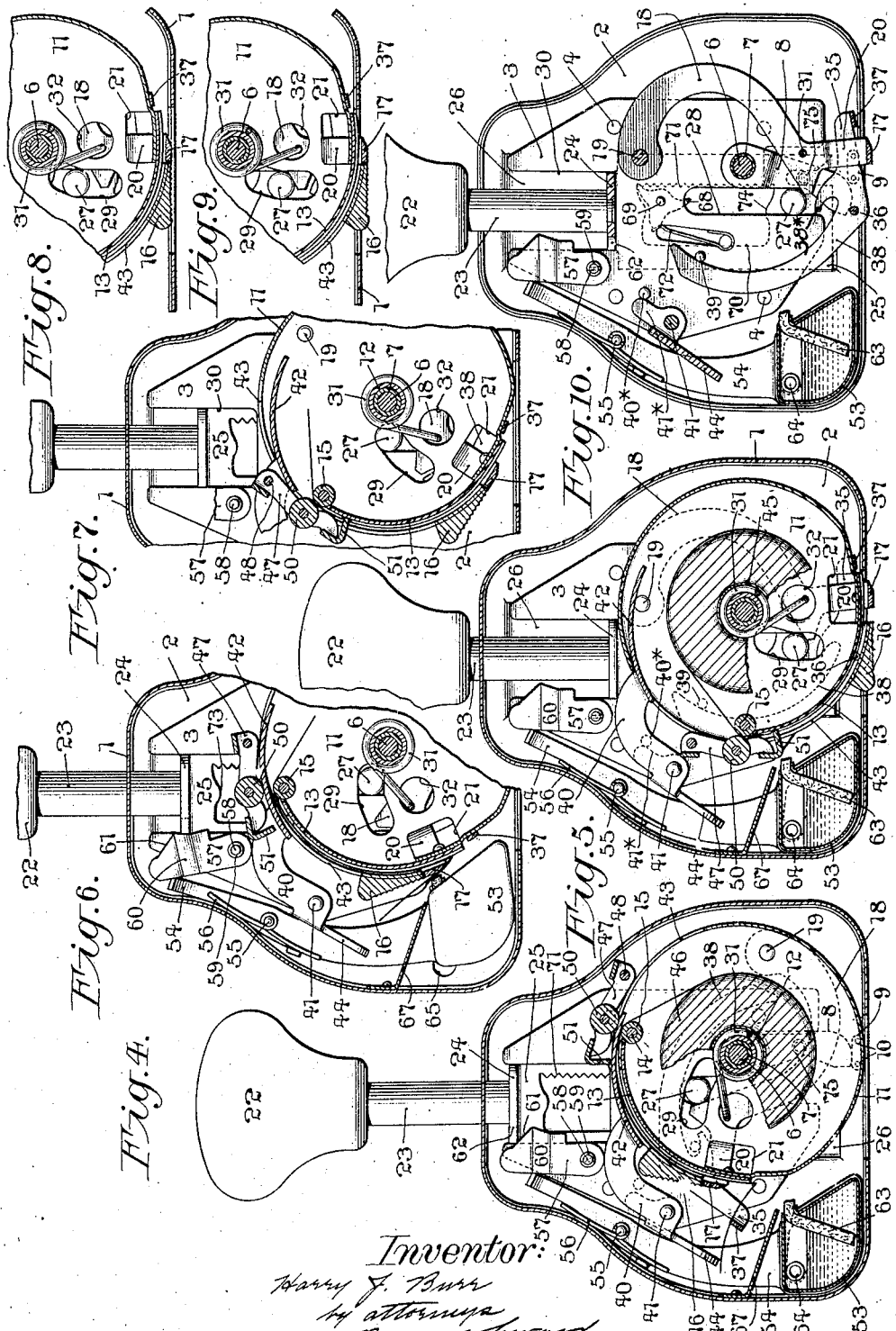

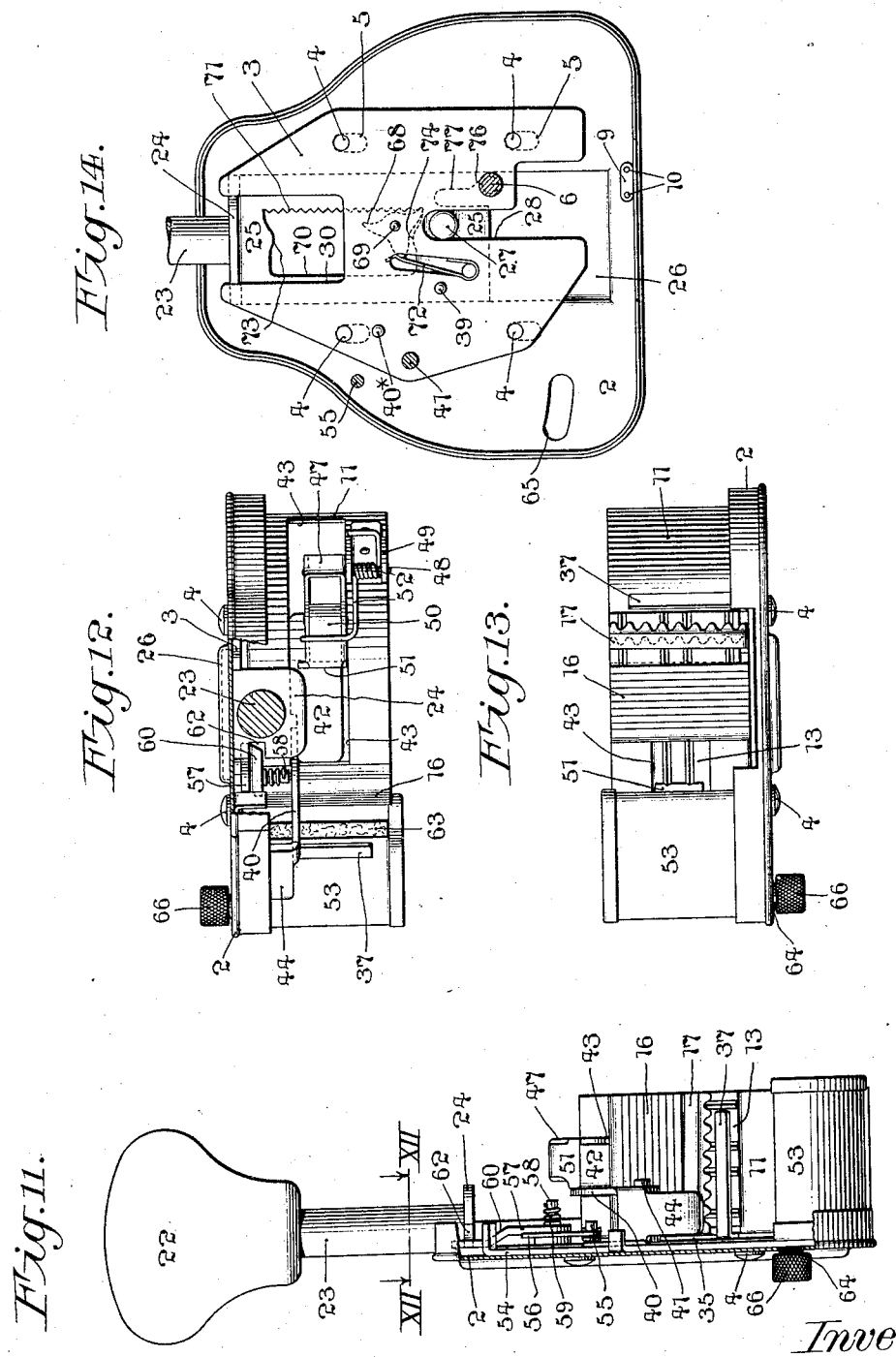

UNITED STATES PATENT OFFICE.

HARRY J. BURR, OF EAST ORANGE, NEW JERSEY, ASSIGNOR TO THE POSTCRAFT COMPANY, INC., OF NEW YORK, N. Y., A CORPORATION OF NEW YORK.

STAMP-AFFIXING MACHINE.

1,406,534.  Specification of Letters Patent.  Patented Feb. 14, 1922.

Application filed May 17, 1918. Serial No. 235,165.

*To all whom it may concern:*

Be it known that I, HARRY J. BURR, a citizen of the United States, and resident of East Orange, in the county of Essex and State of New Jersey, have invented a new and useful Improvement in Stamp-Affixing Machines, of which the following is a specification.

The object of this invention is to provide certain improvements in the construction, form, arrangement and operation of the several parts of a stamp affixing machine, whereby its structure is materially simplified and its accuracy of operation is ensured.

This invention is more particularly directed to improvements on the machine covered by United States Letters Patent No. 1,239,624, dated September 11, 1917.

In the accompanying drawings,

Fig. 1 is a back view of the machine, the parts being shown in their normal positions.

Fig. 2 is a section on the line II—II of Fig. 1.

Fig. 3 is a section on the line III—III of Fig. 2.

Fig. 4 is a section on the line IV—IV of Fig. 2.

Fig. 5 is a similar section showing the positions of the parts at the limit of the downward movement of the operating handle after the stamp has been affixed and separated from its ribbon.

Figs. 6, 7, 8 and 9 are detail sections, showing the positions of the parts at different points in the downward movement of the handle.

Fig. 10 is a section taken in the plane of the line X—X of Fig. 2, with the handle depressed to the limit of its downward movement as in Fig. 5, with front casing member removed.

Fig. 11 is a side view of the machine with the front casing member removed and a portion of the back casing member broken away, the handle being in its normal raised position.

Fig. 12 is a section taken in the plane of the line XII—XII of Fig. 11, with a portion of the back casing member broken away.

Fig. 13 is a bottom plan view of the machine with the front casing removed, the parts being in the position they assume when the handle is at the limit of its downward movement as in Figs. 5 and 10, and Fig. 14 is a detail front view of the frame plate and handle slide, showing the parts in the positions they assume when the handle is in its normal raised position.

The machine casing comprises separable front and back members 1 and 2. A frame plate 3 is secured along the back member 2, by pin and slot connections 4, 5, permitting a limited vertical sliding movement between the frame plate and casing. A fixed stud shaft 6 extends forwardly from the frame plate 3, and on this shaft is loosely mounted the sleeve 7 of a rocker cam lever 8 which coacts with an abutment 9 secured at 10 to the back casing member 2 for controlling the relative vertical movement of the frame plate and casing, as will hereinafter appear.

The stamp drum 11 has a rocking movement and a bodily vertical reciprocatory movement. Its hub 12 is loosely mounted on the sleeve 7. The peripheral wall of the drum is divided; a curved guide 13 forming an extension of one end of the wall, terminating at a stud 14 having a roller 15 over which the stamp ribbon passes. The other end of the wall of the drum overlaps and is spaced from the curved guide 13 to form a channel through which the stamp ribbon passes, said end terminating in a suitably shaped presser foot 16.

A stamp severing knife 17 is located in front of and normally in close proximity to the presser foot 16, which knife forms the lateral extension of a lever 18 pivoted at 19 to the back of the drum 11. This lever 18 is provided with an offset portion 20 having a limited movement in a slot 21 in the back wall of the drum 11.

The operating handle 22 has its shank 23 slidable through the top of the casing 1, 2, the lower end of which shank is secured to the forwardly turned upper end 24 of a slide 25 located within the casing between the back casing member 2 and the frame plate 3, in the present instance, in a shallow groove 26 formed in the wall of the back casing member 2. This slide 25 is provided with a stud 27 which travels in a vertical groove 28 in the frame plate 3, and also in an elongated groove 29 in the back wall of the drum. The forwardly turned upper end 24 of the slide 25 travels in a vertical groove 30 in the upper end of the frame plate 3.

A helical spring 31 surrounds the hub 12 of the drum, one end of which spring passes through a slot 32 in the back wall of the drum into engagement with the knife lever 18. The other end of this helical spring is seated in a kerf 33 in the end of the rocker cam lever sleeve 7, and passes through a wider kerf 34 in the end of the stud shaft 6, thereby permitting the sleeve 7 and its cam lever 8 a limited rocking movement under spring tension.

A folding lever 35 for folding over the leading stamp of the ribbon on the return movement of the drum, is pivoted at 36 to the back wall of the drum 11, the outer end 37 of which lever is turned laterally across the drum in front of the knife 17. The inner arm 38 of this lever is provided with a cam surface engaging a stud 39 fixed on the frame plate 3, said cam surface terminating in a hook 38* to swing the lever as the drum is oscillated.

The stamp feed lever 40 is pivoted at 41 on the frame plate 3, the inner arm of which lever is provided with a curved feed plate 42 normally located along an elongated slot 43 in the peripheral wall of the drum. This lever 40 is provided with a suitable operating handle 44 for manipulating the lever in threading the ribbon of stamps. A stop 40* is arranged in position to engage an arm 41* of the lever to limit the inward movement of the curved feed plate 42 when its coacting roller 15 passes from under the plate in the forward rocking movement of the drum.

The core 45 of the roll of stamps 46 is loosely mounted on the helical spring 31 and the ribbon of stamps leading from the roll, passes between the roller 15 and curved plate 42 and through the channel formed between the overlapping ends of the drum. The free end of this ribbon passes underneath the knife 17 and over the laterally turned end 37 of the folding lever 35. A safety lock 47 is provided for preventing the removal of the stamps except by the successive operation of the machine to affix the stamps, which lock is pivoted at 48 to a bracket 49 secured to the peripheral wall of the drum 11, at one side of the elongated slot 43. This safety lock 47 is provided with a roller 50 and an inwardly turned stamp locking lip 51. A spring 52 yieldingly holds the safety lock 47 at the limit of its inward movement and causes it to act as a pressure means for the curved feed plate 42 when engaged therewith, to press the feed plate against the roller 15.

A stamp moistener reservoir 53 is carried at the lower end of a lever 54 pivoted at 55, to the back casing member 2, a spring 56 serving to normally hold the moistener at the limit of its outward movement. This lever is operated from the handle 22, as follows:

A cam dog 57 is mounted to have both lateral and swinging movements on the stud 58 projecting forwardly from the frame plate 3. A spring 59 serves to yieldingly hold the dog at the limit of its lateral movement against the frame plate 3. The body of the dog is bent to form a cam 60, and a double cam surface 61 is formed along the inner edge of the dog. The forwardly turned upper end 24 of the handle slide 25 is provided with a recess 62 through which the cam surface 61 of the dog passes, on the upward movement of the handle, the dog being swung backwardly to rock the moistener lever to swing the moistening device inwardly during the downward movement of the handle by the engagement of the cam surface 61 of the dog with the adjacent edge of the forwardly turned upper end 24 of the plate 25 at the side of the recess 62.

The reservoir 53 is provided with a stamp moistening device, such as a wick 63 and it is also provided with a water inlet 64 which passes through an elongated slot 65 in the back casing member 2, and is provided with an exterior filling cap 66.

A shield 67 is secured to the front casing member 1, above the reservoir 53.

The means for ensuring the full downward or upward movement of the handle to complete the affixing or return operation of the machine when once started, is as follows: A double pawl 68 is pivoted at 69, to the back of the frame plate 3, which pawl is located within a vertical slot 70 in the slide 25 in position to engage the teeth of a rack 71 along one side of the slot. A spring 72 serves to hold the pawl yieldingly in engagement with the rack. The top wall of the slot 70 has a cam surface 73 arranged to engage the pawl to throw it over to one position when the slide is depressed to the limit of its movement, and the bottom wall of said slot has a cam surface 74 arranged to engage the pawl and throw it over to its other position when the slide is raised to the limit of its upward movement, the spring 72 acting to yieldingly hold the pawl in either of its positions.

The swinging movement of the rocker cam lever 8 against the tension of the helical spring 31, is obtained by the engagement of a stud 75 on the lever with a cam surface 76 at the lower end of the slide 25, a vertical slot 77 at the end of said cam surface serving to receive the said stud 75.

In operation, presupposing the parts to be in their normal position as shown in Fig. 4, for instance; the machine is placed upon the article to which the stamp is to be affixed and the handle 22 is depressed to the limit of its downward movement. During this downward movement, the following conditions obtain. As the handle starts on its downward movement, the drum starts on its forward rocking movement through the engagement of the slide stud 27 with the wall of the groove 29 in the drum to move the drum against the tension of the helical spring 31. As the drum rotates in this forward direction, the folding lever will be caused to swing inwardly to bring its laterally turned outer end 37 snugly against the peripheral wall of the drum in front of the stamp severing knife 17 and the roller 50 of the safety lock 47 will have traveled a short distance along the curved plate 42 of the stamp feed lever. At the same time, the stamp moistening reservoir 53 has been swung inwardly to bring its moistening device 63 into position to engage the back of the previously folded over stamp. At the same time also, the presser foot 16 and severing knife 17 have moved along the ribbon to take up the over-feed of the ribbon and bring the knife into the apex of the fold along the dividing line between two stamps. These positions of the parts are illustrated in Fig. 6.

The further downward movement of the handle 22 and its slide 25 will rotate the drum still further in its forward direction, taking the ribbon with it, causing the back of the stamp to be wiped across the moistening device 63 and causing the roller 50 of the safety lock to ride off the end of the curved feed plate 42 to bring the inwardly turned lip 51 of the safety lock into locking engagement with the stamp ribbon. The positions of the parts as above described, are shown in Fig. 7.

The further downward movement of the handle and its slide will bring the parts to the positions shown in Fig. 8, with the turned over stamp interposed between the article to which the stamp is to be affixed and the presser foot 16 and adjoining severing knife 17. With the parts in this position, a portion of the slot 29 in the back wall of the drum is brought into a substantially vertical position with the stud 27 about to enter this vertical portion of the slot. A further slight downward movement of the handle and its slide will cause the stud 75 on the rocker cam lever 8, to be engaged by the cam surface 76 at the lower end of the slide to swing the cam lever 8 against the tension of the helical spring 31, out of its locking engagement with the abutment 9, and permit the bodily vertical movement of the drum and frame plate, together with the parts carried thereby, with respect to the casing because of the pin and slot connection 4, 5 to bring the parts into the position shown in Fig. 9, where the moistened stamp is pressed firmly against the article to which it is to be affixed. This movement brought the slide stud 27 down into engagement with the knife lever 18.

A still further slight downward movement of the handle will cause the stud 27 to swing the knife lever against the tension of the helical spring 31 to move the knife 17 a short distance away from the presser foot 16, sufficient to sever the leading stamp from the ribbon. This final downward movement of the handle and its slide will also cause the double pawl 68 which has been locking the handle slide against upward movement, to be engaged by the cam surface 74 to throw the pawl over into the position to release the slide to permit the helical spring 31 to return the parts to their normal position.

As the handle and its slide start on their upward movement, the knife 17 will first be returned to its position in proximity to the presser foot 16, the offset portion 20 of the lever 18 engaging the wall of the recess 21 in the drum to limit the movement of the lever. The further upward movement of the handle and its slide will permit the drum and frame plate to move vertically with respect to the casing and the stud 75 of the rocker cam lever 8 will move back along the cam surface 76 under the influence of the helical spring 31 to return the rocker cam lever into its locking position in engagement with the abutment 9. The further upward movement of the handle and its slide will permit the reverse rocking movement of the drum, the stamp ribbon being moved with the drum until the inwardly turned lip 51 of the safety lock 47 is lifted out of its locking engagement with the ribbon by the engagement of the roller 50 with the curved feed plate 42 of the feed lever 40, when the further rearward movement of the drum will take place while the stamp ribbon is held against movement by the pressure of the roller 50 on the feed plate 42, through the medium of the spring 52. This latter part of the movement will, because of the rolling movement of the roller, cause the next succeeding stamp of the ribbon to be exposed beyond the presser foot and knife with a slight overfeed, and as the drum approaches the limit of its reverse rocking movement, the laterally turned outer end 37 of the folding lever 35 will be swung outwardly by the engagement of the stud 39 with the hook 38* at the end of the cam surface on the inner arm 38 of the said lever, thus folding over the stamp to substantially the position shown in Fig. 4.

The slight overfeed of the stamp ribbon as the parts return to their normal positions ensures accurate folding over of the stamp along its division line and the engagement of the knife in the apex of the folded over portion in the next succeeding operation of the machine.

During this return movement of the parts, the cam dog 57 which controls the movement of the reservoir 53, will, because of its cam 60 and laterally yielding movement, ride through the recess 62 in the forwardly turned upper end 42 of the slide without rocking the dog and swinging the moistener lever.

It is to be understood that during the first part of the downward movement of the handle, the drum will move forwardly along the ribbon until the knife 17 enters the apex of the fold between the ribbon and the folded over stamp, when the ribbon will be moved thereafter with the drum, as hereinbefore described. This movement will always ensure the separation of the stamps along their dividing lines when the knife is operated.

It is also to be observed that as the handle and slide reach the limit of their upward movement, the cam surface 73 of the slot 70 in the slide will engage the double pawl 68, (which has been locking the slide against downward movement until it has completed its upward movement) to throw it over to its original position to lock the handle against upward movement once it has again been started on its downward movement. This ensures the complete movement of the drum in either direction.

It is to be understood that any suitable means may be employed for locking the front and back casing members together. When it is desired to place a roll of stamps in the machine, the front casing member is removed, the roll of stamps is placed in position within the drum and the ribbon threaded through the channel between the inner and outer overlapping walls of the drum and a stamp folded back in position to be engaged by the knife 17. To facilitate this threading of the ribbon, the handle 44 of the feed lever may be pressed inwardly to raise the curved feed plate 42 and safety lock 47 against the tension of the spring 52.

While I have described this machine as a stamp affixing machine, it is obvious that it may be used for affixing gummed labels of any character in ribbon form.

It is obvious that various changes may be resorted to in the construction, form and arrangement of the several parts without departing from the spirit and scope of my invention and hence I do not wish to limit myself strictly to the construction herein described, but

What I claim is:

1. In a machine of the character described, a casing, a rotatable drum adapted to contain a series of stamps in ribbon form, a drum supporting frame slidably mounted in the casing and means to impart a bodily movement to said frame and drum to affix a stamp.

2. In a machine of the character described, a casing comprising separable members, a rotatable drum adapted to contain a series of stamps in ribbon form, a drum supporting frame slidably mounted on one of the casing members and means to impart a bodily movement to said frame and drum to affix a stamp.

3. In a machine of the character described, a casing comprising separable members, a rotatable drum adapted to contain a series of stamps in ribbon form, a drum supporting frame slidably mounted on one of the casing members and a manually operated slide mounted between said casing member and frame to impart a bodily movement to said frame and drum to affix a stamp.

4. In a machine of the character described, a casing comprising separable members, a rotatable drum adapted to contain a series of stamps in ribbon form, a drum supporting frame slidably mounted on one of the casing members, a manually operated slide mounted between said casing member and frame to impart a bodily movement to said frame and drum to affix a stamp and a frame locking device operated by said slide.

5. In a machine of the character described, a casing comprising separable members, a rotatable drum adapted to contain a series of stamps in ribbon form, a drum supporting frame slidably mounted on one of the casing members, a manually operated slide mounted between said casing member and drum to impart a bodily movement to said frame and drum to affix a stamp, a rocker cam lever engaging the casing member to lock the frame against movement, and a cam on said slide arranged to swing said lever to release the frame.

6. In a machine of the character described, a rotatable drum adapted to contain a series of stamps in ribbon form, a drum supporting frame, a manually operated slide for rocking the drum, a rack on the slide and a spring-pressed double pawl carried by the frame for preventing the reverse movement of the drum until it has completed its movement, and cam surfaces on the slide for throwing the pawl at the limits of movement of the slide.

7. In a machine of the character described, a rotatable drum adapted to contain a series of stamps in ribbon form, a drum supporting frame, a manually operated slide for rocking the drum forwardly, spring means for returning the drum, a rack on the slide and a spring-pressed double pawl carried by the frame for preventing the reverse movement of the drum until it has completed its forward or return movement and cam surfaces on the slide for throwing the pawl at the limits of movement of the slide.

8. In a machine of the character described, a casing member, a stamp moistener carried thereby, a rotatable drum adapted to contain a series of stamps in ribbon form, a drum supporting frame, an operating handle, means on the frame operated by the downward movement of the handle to bring the moistener into engagement with the back of a stamp, and mechanism to effect the affixing of the stamp.

9. In a machine of the character described, a casing member, a stamp moistener carried thereby, a rotatable drum adapted to contain a series of stamps in ribbon form, a drum supporting frame, an operating handle, a laterally movable swinging dog on the frame rocked by the downward movement of the handle to bring the moistener into engagement with the back of a stamp, and mechanism to effect the affixing of the stamp.

10. In a machine of the character described, a casing member, a stamp moistener carried thereby, a rotatable drum adapted to contain a series of stamps in ribbon form, a drum supporting frame having a limited sliding movement on said casing member, an operating handle and a laterally movable swinging dog on the frame rocked by the downward movement of the handle to bring the moistener into engagement with the back of a stamp and mechanism to effect the affixing of the stamp.

11. In a machine of the character described, a drum adapted to contain a series of stamps in ribbon form, a drum supporting frame, a stamp folding lever pivoted on the drum and having a cam surface terminating at one end in a hook and a stud fixed on the frame arranged to engage said cam surface and hook for controlling the movement of the lever as the drum is oscillated and means for oscillating the drum.

12. In a machine of the character described, a drum having a stamp ribbon feeding channel and a roller, a stamp feed lever having a spring-pressed feed plate normally located in position to coact with said roller to feed the ribbon as the drum rocks rearwardly and means for rocking the drum and for effecting the affixing of a stamp.

13. In a machine of the character described, a drum having a stamp ribbon feeding channel, a stamp feed lever having a feed plate normally located in said channel, a spring-pressed safety lock normally resting on said plate to press it into engagement with the stamp ribbon, said safety lock being arranged to ride off the plate into locking engagement with the stamp ribbon as the drum rocks forwardly and to ride back onto the plate as the drum rocks rearwardly and means for rocking the drum and for effecting the affixing of a stamp.

14. In a machine of the character described, a rotatable drum having an elongated slot, a stamp ribbon feeding channel and a roller, a stamp feed lever having a feed plate normally located in said channel, a spring-pressed safety lock normally resting on said plate to press the stamp ribbon against said roller to feed the ribbon as the drum rocks rearwardly and means for rocking the drum and for effecting the affixing of a stamp.

15. In a machine of the character described, a rotatable drum having an elongated slot, a stamp ribbon feeding channel and a roller, a stamp feed lever having a feed plate normally located in said channel, a spring-pressed safety lock normally resting on said plate to press the stamp ribbon against said roller to feed the ribbon as the drum rocks rearwardly, said safety lock being arranged to ride off the plate into locking engagement with the stamp ribbon as the drum rocks forwardly and to ride back onto the feed plate as the drum rocks rearwardly, and means for rocking the drum and for effecting the affixing of a stamp.

16. In a machine of the character described, a rotatable drum adapted to contain a series of stamps in ribbon form, devices arranged to over-feed the ribbon as the drum rocks backwardly and to take up the over-feed and thereafter advance the ribbon with the drum as the drum rocks forwardly and means for rocking the drum backwardly and forwardly and for effecting the affixing of the stamp.

17. In a machine of the character described, a rotatable drum adapted to contain a series of stamps in ribbon form, devices arranged to over-feed the ribbon and to fold back the leading stamp thereon as the drum rocks backwardly and to take up the over-feed and thereafter advance the ribbon with the drum as the drum rocks forwardly and means for rocking the drum backwardly and forwardly and for effecting the affixing of the stamp.

18. In a machine of the character described, a rotatable drum adapted to contain a series of stamps in ribbon form, means for over-feeding the ribbon and folding a stamp at an angle thereto as the drum rocks backwardly and means on the drum to take up the over-feed and enter the apex of the angle formed by the folded back stamp and to thereafter advance the ribbon with the drum as the drum rocks forwardly and means for rocking the drum backwardly and forwardly and for the effecting the affixing of the stamp.

19. In a machine of the character described, a frame, a rotatable drum mounted thereon having an elongated slot in its peripheral wall and also having a stamp ribbon feeding channel, a stamp feed lever mounted on said frame having a curved feed plate normally located in said channel, a spring-pressed safety lock mounted on said drum normally resting on said curved plate to press it into engagement with the stamp ribbon, said safety lock being arranged to ride off the feed plate into locking engagement with the stamp ribbon as the drum rocks forwardly and to ride back onto the feed plate as the drum rocks rearwardly and means for rocking the drum and for effecting the affixing of a stamp.

In testimony, that I claim the foregoing as my invention, I have signed my name, this 11th day of May 1918.

HARRY J. BURR.